(12) United States Patent
Benne et al.

(10) Patent No.: US 10,271,485 B2
(45) Date of Patent: Apr. 30, 2019

(54) METHOD AND APPARATUS FOR GROWING PLANTS

(75) Inventors: Jacob Benne, Milner (CA); Daniel Meikleham, Calgary (CA)

(73) Assignee: Cubicfarm Systems Corp., Surrey (CA)

( * ) Notice: Subject to any disclaimer, the term of this patent is extended or adjusted under 35 U.S.C. 154(b) by 466 days.

(21) Appl. No.: 13/461,873

(22) Filed: May 2, 2012

(65) Prior Publication Data

US 2012/0279122 A1    Nov. 8, 2012

Related U.S. Application Data

(60) Provisional application No. 61/483,433, filed on May 6, 2011.

(51) Int. Cl.
*A01G 31/04* (2006.01)

(52) U.S. Cl.
CPC ......... *A01G 31/045* (2013.01); *A01G 31/042* (2013.01); *Y02P 60/216* (2015.11)

(58) Field of Classification Search
CPC ........ A01G 9/024; A01G 9/023; A01G 9/108; A01G 31/042; A01G 31/02; A01G 31/04
USPC ................ 47/82, 59 R, 60, 62 R, 62 N, 62 C
See application file for complete search history.

(56) References Cited

U.S. PATENT DOCUMENTS

| | | | |
|---|---|---|---|
| 3,254,447 A * | 6/1966 | Ruthner | 47/65 |
| 3,254,448 A * | 6/1966 | Ruthner | 47/65 |
| 3,529,379 A * | 9/1970 | Ware | 47/17 |
| 3,909,978 A * | 10/1975 | Fleming | 47/82 |
| 4,035,949 A * | 7/1977 | Ruthner | 47/17 |
| 4,255,897 A * | 3/1981 | Ruthner | 47/65 |
| 2004/0111965 A1 * | 6/2004 | Agius | 47/62 R |
| 2009/0307973 A1 * | 12/2009 | Adams et al. | 47/62 C |

FOREIGN PATENT DOCUMENTS

| | | |
|---|---|---|
| CA | 1106607 | 8/1981 |
| CA | 2497936 | 3/2003 |
| GB | 984404 | 6/1965 |

(Continued)

OTHER PUBLICATIONS

JP 10174533A machine translation.*

(Continued)

*Primary Examiner* — Son T Nguyen
(74) *Attorney, Agent, or Firm* — Morgan, Lewis & Bockius LLP

(57) ABSTRACT

Plants are grown in a growing machine by advancing a plurality of plant cradles on an endless conveyor along a growing path, at least a portion of the path being an undulating path having alternating upward and downward portions and having a return portion for looping back to the undulating portion. Using a pair of parallel endless conveyors, the cradles are removably supported between the conveyors. The cradles are supplied with growth-sustaining liquid and growth-promoting light. The cradles are advanced along the path until the one or more plants have reached a target growth after which they can be harvested or transferred to one or more subsequent machines until mature for harvest. The machine can be in a controlled environment, including located in modules arranged in series, parallel or combinations thereof.

12 Claims, 17 Drawing Sheets

(56) References Cited

FOREIGN PATENT DOCUMENTS

| JP | WO 9610328 A1 | * | 4/1996 | ............ A01G 31/02 |
|----|---------------|---|--------|--------------------------|
| JP | 10174521 A | * | 6/1998 | |
| JP | 10174533 A | * | 6/1998 | |
| JP | 2008-253241 A | | 10/2008 | |
| JP | 2008253241 A | * | 10/2008 | |
| JP | 2009100700 A | * | 5/2009 | |

OTHER PUBLICATIONS

JP 2008253241A machine translation.*
International Search Report and Written Opinion of Applicant's PCT/CA2012/050281 dated Jul. 12, 2012.

* cited by examiner

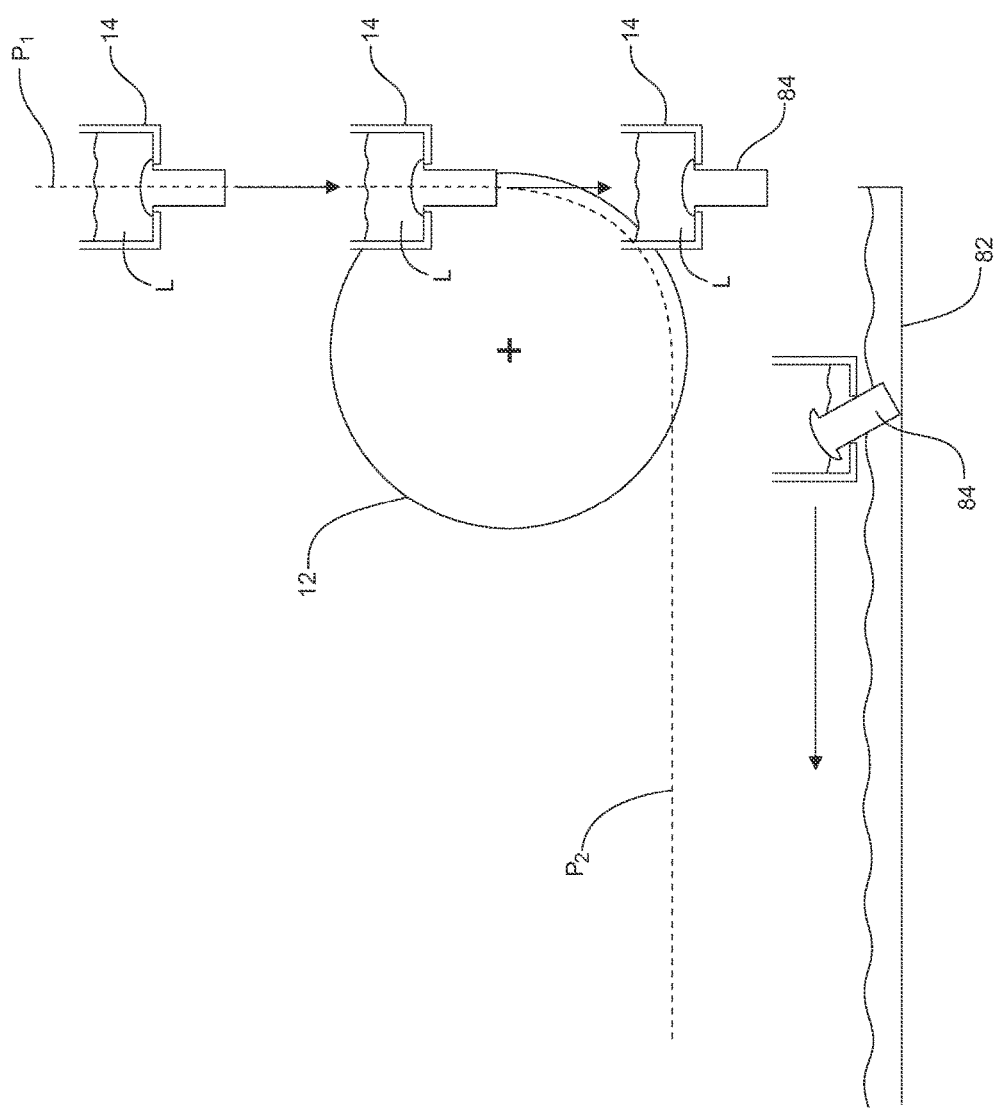

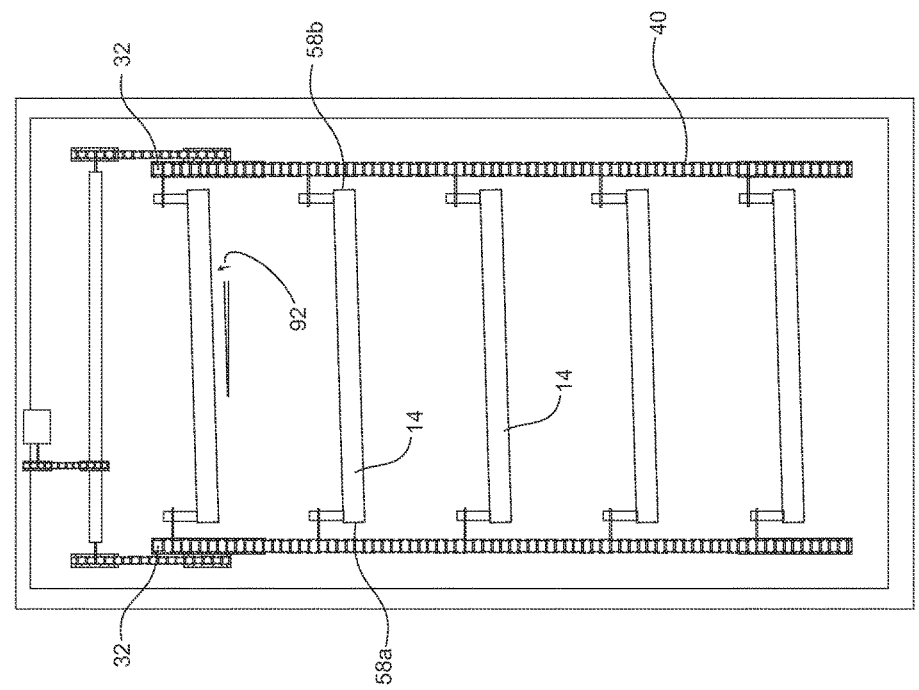
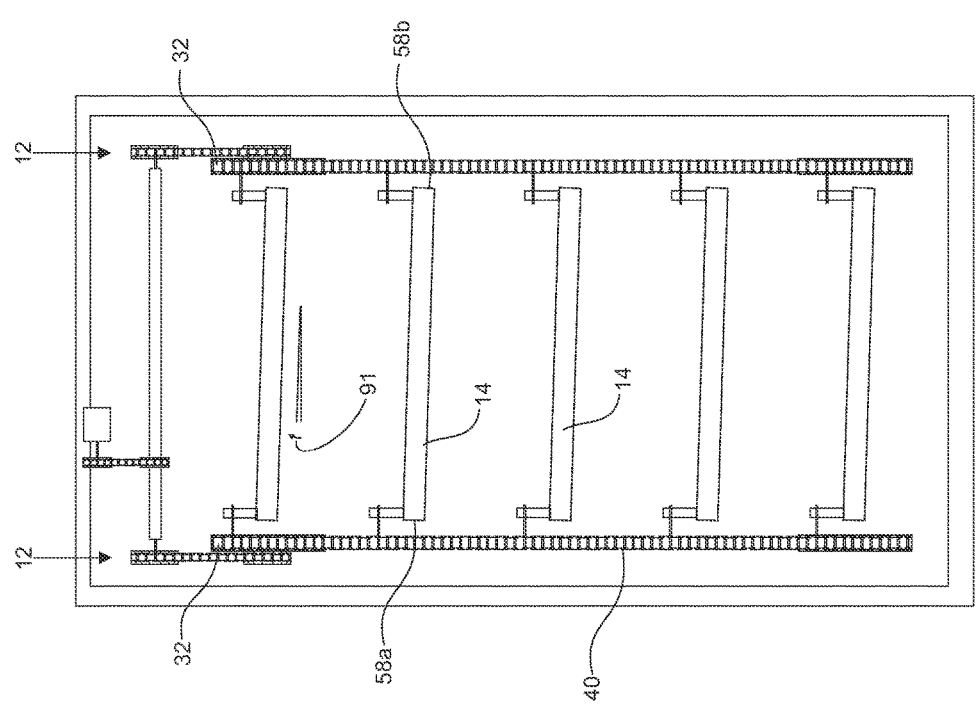
Fig. 10B
Fig. 10A

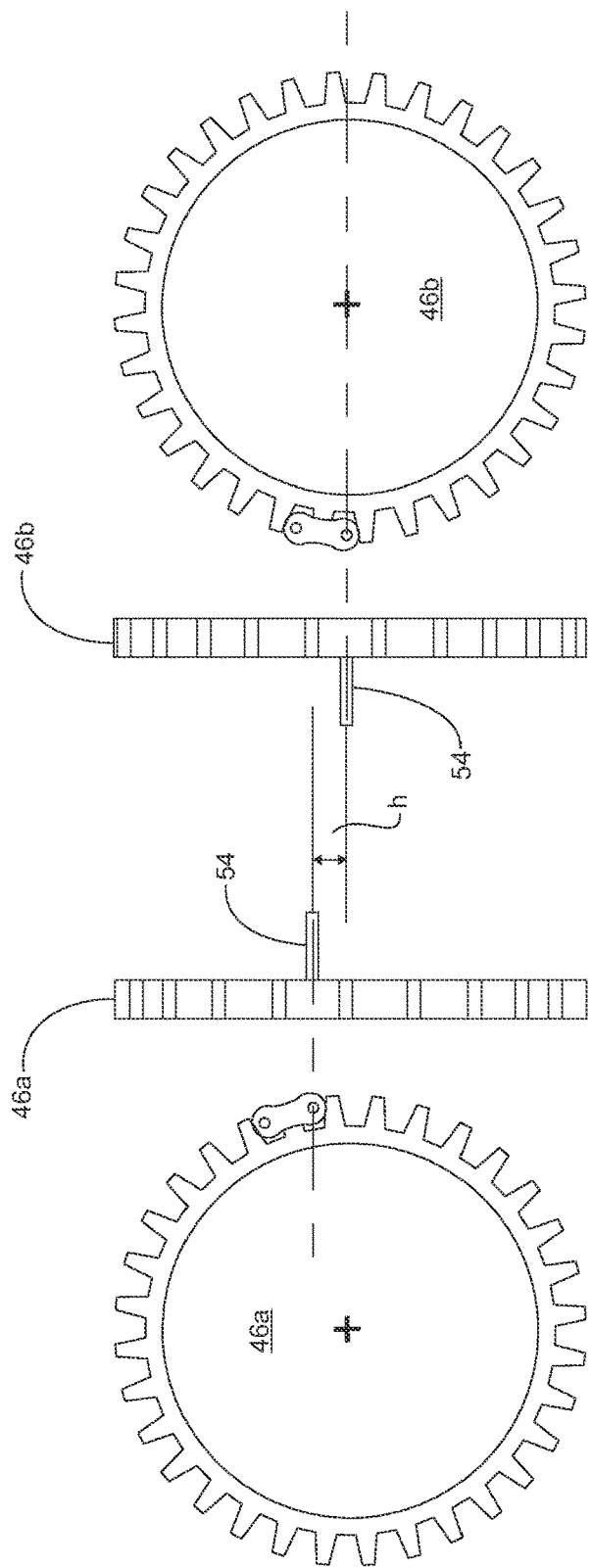

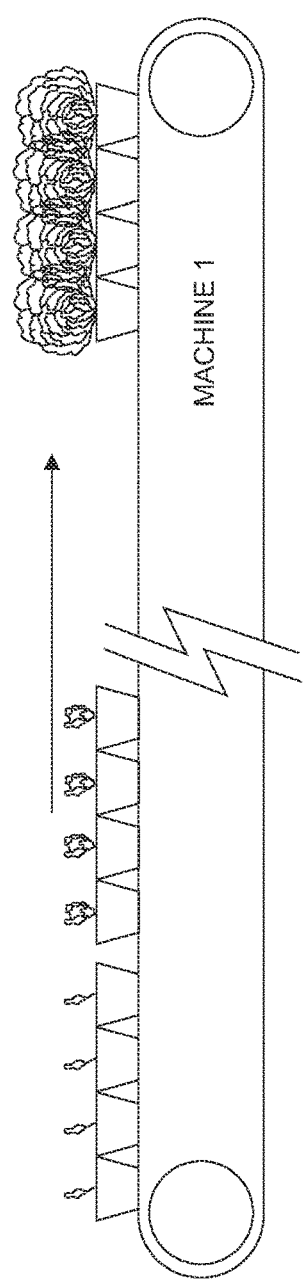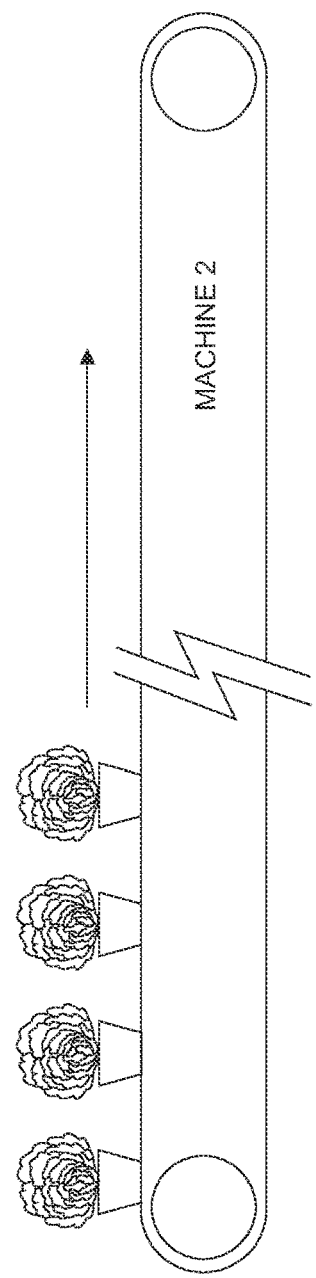
Fig. 12A
Fig. 12B

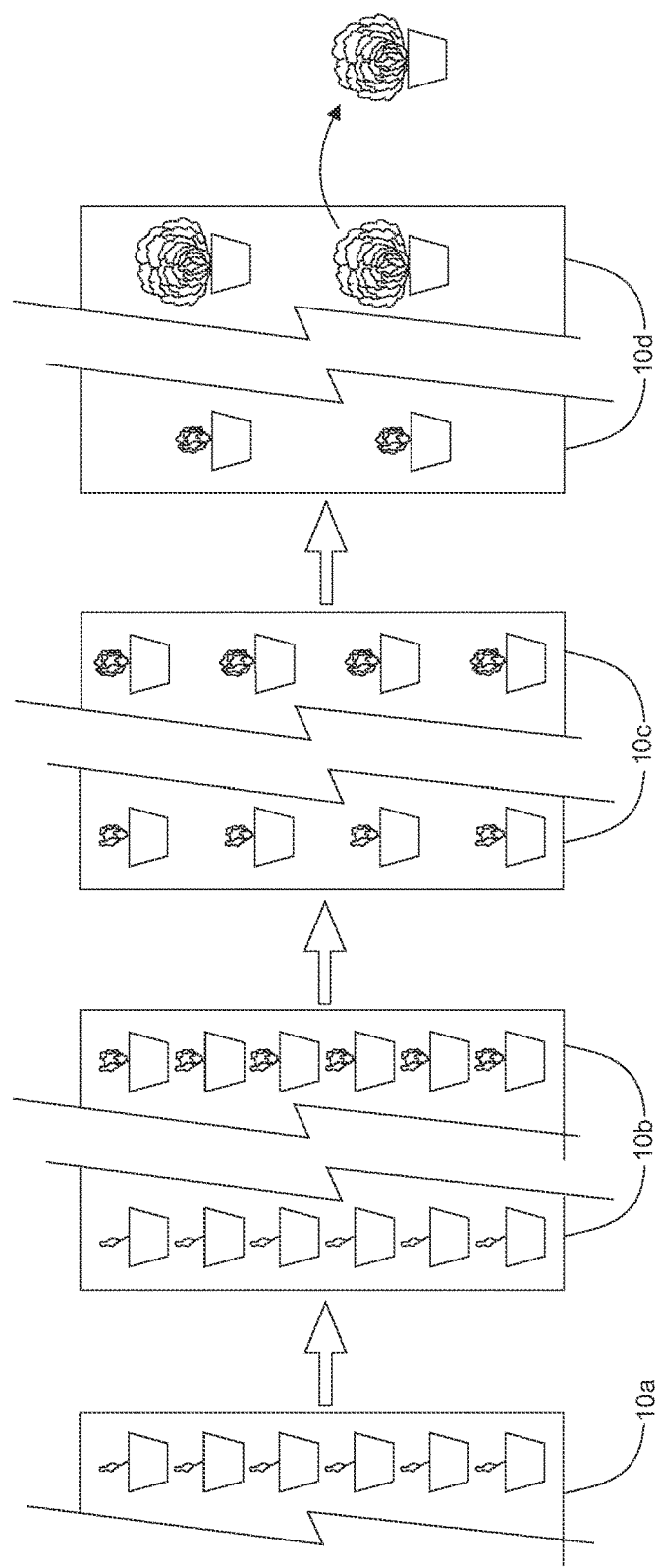

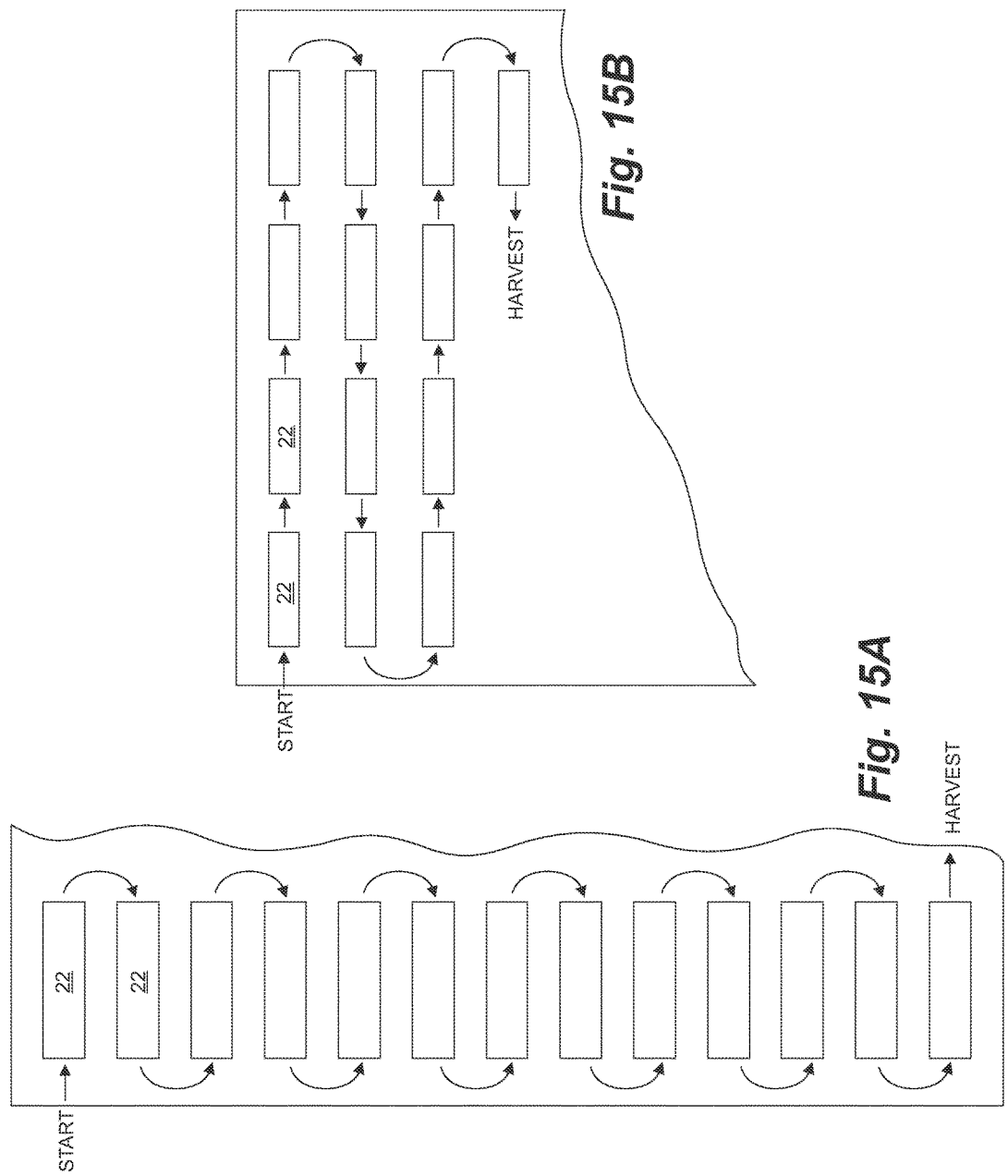

METHOD AND APPARATUS FOR GROWING PLANTS

CROSS REFERENCE OF RELATED APPLICATIONS

This application claims the benefits under 35 U.S.C 119(e) of U.S. Provisional Application Ser. No. 61/483,433, filed May 6, 2011, which is incorporated fully herein by reference.

FIELD

Embodiments disclosed herein relate to a system and method for growing plants in a controlled environment. More specifically, the embodiments relate to a system and method using an endless conveyor in a controlled environment for maximizing production while minimizing a footprint.

BACKGROUND

Traditional commercial farming techniques are typically labor intensive, and require vast amounts of viable land to harvest a crop. At the beginning of each growing cycle or season, an operator or farmer must first prepare the field before planting either seeds or seedlings of a crop of interest. Preparation of a field typically involves plowing a field by pulling a plow behind a tractor back and forth across the entire field. Depending on the size of the field to be plowed, plowing is typically labor and time intensive and costs associated with the fuel used in the tractor can be substantial.

After plowing the field, the farmer, using commercially available seeds or seedlings, can then plant the crop by pulling a seeding machine or seeder back and forth across the field. Again, seeding or planting the field can be labor and time intensive and can have substantial costs associated with it.

A typical farm usually employs a system for irrigating the field. Further, to encourage rapid and healthy growth of the crop, the farmer may also decide to apply fertilizers (chemical or otherwise) which can be done by either traveling back and forth across the field pulling a fertilizer applicator with the tractor, or by spraying a chemical fertilizer from the air using aircraft, such as a small airplane or helicopter.

During the growing cycle of the planted crop, the farmer can also ensure that the crop is not damaged by pests or invasive weeds by spraying chemical pesticides and/or herbicides. The spraying of the chemical pesticides and/or herbicides is typically done by either travelling back and forth across the field with a chemical applicator, or can be sprayed aerially from an aircraft.

After the crop matures, harvesting is typically done by traveling back and forth across the field in harvesting equipment, such as a combine or a harvester being pulled by the tractor.

The harvested crop can then transported from the farm to processing centers to be packaged and distributed to local warehouses where they will be shipped to local supermarkets or other groceries. The transfer from the farm to local groceries or supermarkets can take upwards of 7 days or longer, depending on the geographical location of the final destination of the crop.

Typically, harvesting a crop occurs when about 10% of the crop is over mature and when about 10% is under mature. Further, about another 20% of the remaining crop spoils as a result from long distance transportation and related warehousing which reduces shelf life due to the time from harvest to retail shelf.

Traditional farming techniques require large expanses of viable farm land, large capital investments for farm machinery, large capital expenses for fuel, and large expenses for shipping. Traditional farming techniques are also at the mercy of unpredictable weather patterns, such as floods, extreme temperatures, extraordinary storms, etc., which can cause substantial damage to a potential crop.

Traditional farming techniques further require large storage or warehouse space to receive harvested crop and to re-distribute the crop to their final destinations. Up to 70% of the retail costs for vegetables at the local market can be attributed to transportation costs. Further, due to the transportation times, much of the vegetables that are sold at the local markets are not fresh and do not have their full nutritional content.

For example, lettuce farmed using traditional farming techniques produces about 200,000 heads of lettuce per acre per year. A head of lettuce produced in California, USA, requires 6 days to travel from the farm to a local market in Calgary, Alberta, Canada. It is known that just 2 days after harvest, the lettuce will lose about 50% of its nutritional value. Thus, the lettuce sold to consumers in Calgary, Alberta, Canada, will not be fresh, already being at least 6 days old and having less than about 50% of its nutritional value.

International Published Patent Application WO 2010/097562 to Bradford et. al., assigned to Valcent Product (EU) Limited, teaches a growing room, such as a greenhouse, for growing plants in a controlled environment. The growing room houses a vertical growing system for growing plants in the controlled environment. The system comprises a horizontal overhead conveyor system supporting a plurality of support assemblies therefrom and moveable therealong. Each support assembly further comprises a plurality of removable receptacles for planting crops therein. The receptacles can be stacked vertically, one above another, along each support assembly. The overhead conveyor system moves the receptacles along a horizontal path and through a single watering station for providing water and nutrients to the plants as they pass through. The system has a significant areal footprint There is a need for a system and method of farming which reduces the overall costs associated with farming to reduce the price paid by consumers for vegetables and that increases the freshness and nutritional value of crops sold to consumers at local markets.

There is a need for a system and method of farming that increases the overall crop output with a minimum footprint as compared to the crop output from traditional methods of farming.

SUMMARY

A system and method for producing fruits, vegetables and other commercially grown plants in commercial quantities using a small footprint in any location and in any climate is disclosed. The volume of produce or crop output that can be grown in a given footprint is increased dramatically in a controlled agricultural environment compared to traditional industrial commercial farming methods.

Embodiments disclosed herein include a high output growing machine that is suitable for local food production in indoor urban settings leading to improvements in the economic factors of long distance transportation from remote food production areas or farms.

Embodiments can be used to control environmental conditions to use significantly less water than traditional industrial outdoor farming methods and provide greater access to light. Further, as the plants are in controlled indoor environments, the plants are less susceptible to pests and weeds negating the need for pesticides and/or herbicides. Accordingly, embodiments herein have a reduced environmental impact associated the wide scale use of herbicides and pesticides. Safety, sustainability, traceability, and reduced carbon footprint are factors which embodiments take into consideration.

In operation, a growing system is populated with seeds or seedlings in a plurality of growing cradles that are conveyed along an endless conveyor. The endless conveyor can be arranged with a vertically up and down undulating arrangement to maximizes travel in a minimum plan area or footprint. Further, an undulating arrangement enables maximizing of plant exposure to grow lights. The growing system can include means for nutrient application, pollination, and pest control. Each stage of growth can be handled in a module. Further, during the growing cycle, as the plants grow larger and encroach on the growing space of an adjacent plant, the plants can be spaced further apart. To provide sufficient growing space for each plant, cradles can be spaced farther apart from one another to permit plant growth. One embodiment is to move incrementally larger plants to a module having incrementally greater spacing between cradles.

In one aspect, a growing machine for growing plants comprises an endless conveyor forming a growing path having at least a portion of which is an undulating path having alternating upward and downward portions and a return path. A plurality of cradles are spaced along and supported by the conveyor for movement along the growing path, each cradle supporting one or plants therein in a plant and growth-sustaining liquid orientation. One also provides a source of the growth-sustaining liquid and a source of growth-sustaining light.

In another aspect, a method for growing plants comprises: providing a growing machine having an endless conveyor having a plurality of growing cradles spaced apart therealong, each cradle supporting one or more plants therein. The method proceeds with advancing the plurality of cradles along a path, at least a portion of which is an undulating path having alternating upward and downward portions while supplying the cradles with growth-sustaining liquid and exposing the one or more plants to growth-promoting light. As long as the one or more plants have not yet reached a target growth, one continues repeating the advancing the plurality of cradles along the path until the one or more plants have reached the target growth for that machine. Once target growth is reached, and the plants are not yet mature for harvest, the plants can be moved to a further machine, having spaced the plants suitable to make appropriate growing room to achieve the next target growth, and so on until harvest.

As a result, crops can be grown in a minimal footprint, and mature crops can be harvested as just-in-time inventory, grown locally and available to local food retail chains eliminating the substantial wastage typically experience due to delays between industrial agriculture harvesting and ultimate sale to the consumer.

BRIEF DESCRIPTION OF THE DRAWINGS

FIG. 8C is a partial schematic view of the steps of the drain port transitioning from the sealed position to the drain position of the embodiments of FIGS. 8A and 8B;

FIG. 10A is an end view of an embodiment illustrating cradles travelling along one of the upward or downward portion of the undulating path and having one end of the cradle indexed ahead of the other end for imparting a slope to the cradle;

FIG. 10B is an end view of the embodiment of FIG. 10A illustrating the shifting or reversal of the slope of each cradle as the cradle travelled along the along the other of downward or upward portion of the undulating path;

FIG. 11 is a representative drawing of an embodiment, illustrating rotational indexing of opposing drive sprockets, chain and support pins used for shifting a slope of each cradle during travel along a first path;

FIG. 12A illustrates the growing sequence not the apparatus, of a first growing machine having a plants that have grown sufficiently enough to encroach on an available growing space of an adjacent plant;

FIG. 12B illustrating the transfer of the grown plants of FIG. 12A onto a second growing machine, again the growing sequence not the apparatus, of the embodiment of FIG. 12A, the transferred plants being spaced farther apart from one another to increase the available growing space therebetween;

FIGS. 13A through 13D illustrate the implementation of transfer between machines wherein FIG. 13A illustrates an end of a first growing machine having a growing cradle with growing plants, the plants being ready to be transferred to a second growing machine, FIG. 13B illustrates the transfer of the growing plants from the first machine of FIG. 13A to the second or subsequent growing machine, FIG. 13C illustrates the transfer of several of the growing plants from the second machine to a third subsequent growing machine, the growing plants on the third machine being spaced farther apart from one another for increasing an available growing space between the plants, and FIG. 13D illustrates the transfer of several of the plants from the third growing machine to the fourth growing machine, the plants on the fourth growing machine being spaced apart from one another for increasing the growing space between the plants, and the plants being ready for harvesting after full maturation;

FIG. 15A is a representative drawing of a possible layout of a plurality of modules or stacks of modules within a warehouse environment illustrating the overall movement of plants during its growth cycle; and FIG. 15B is a representative drawing of another possible layout of a plurality of modules of stacks of modules within a warehouse environment illustrating the overall movement of plants during its growth cycle.

DETAILED DESCRIPTION

Figure 1:
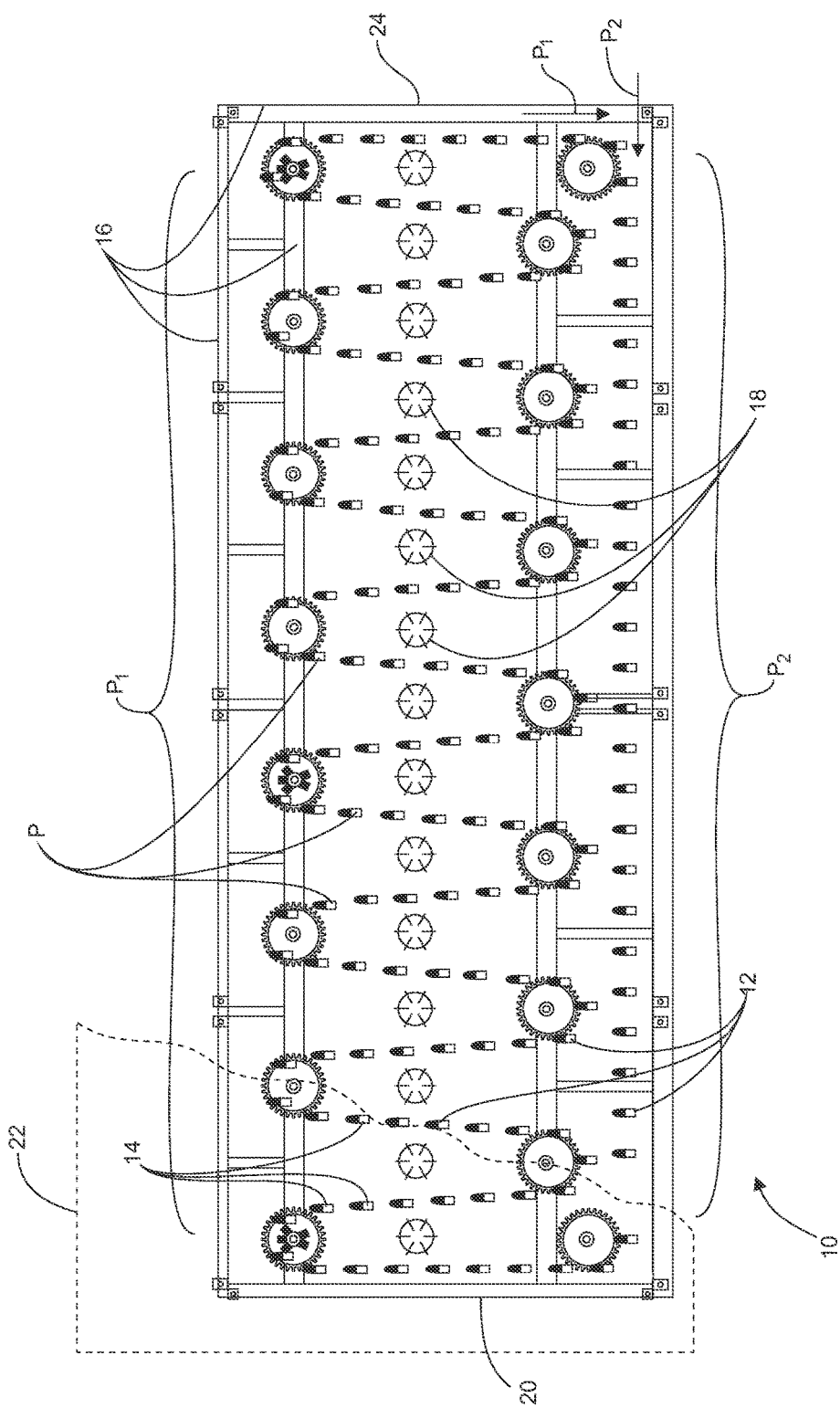
FIG. 1 is a side view of an embodiment of an embodiment illustrating an endless conveyor supporting a plurality of growing cradles moving along a first path in a first direction and returning along a return path in a second direction opposite the first direction, the conveyor hidden for clarity of the other elements.
Figure 2:
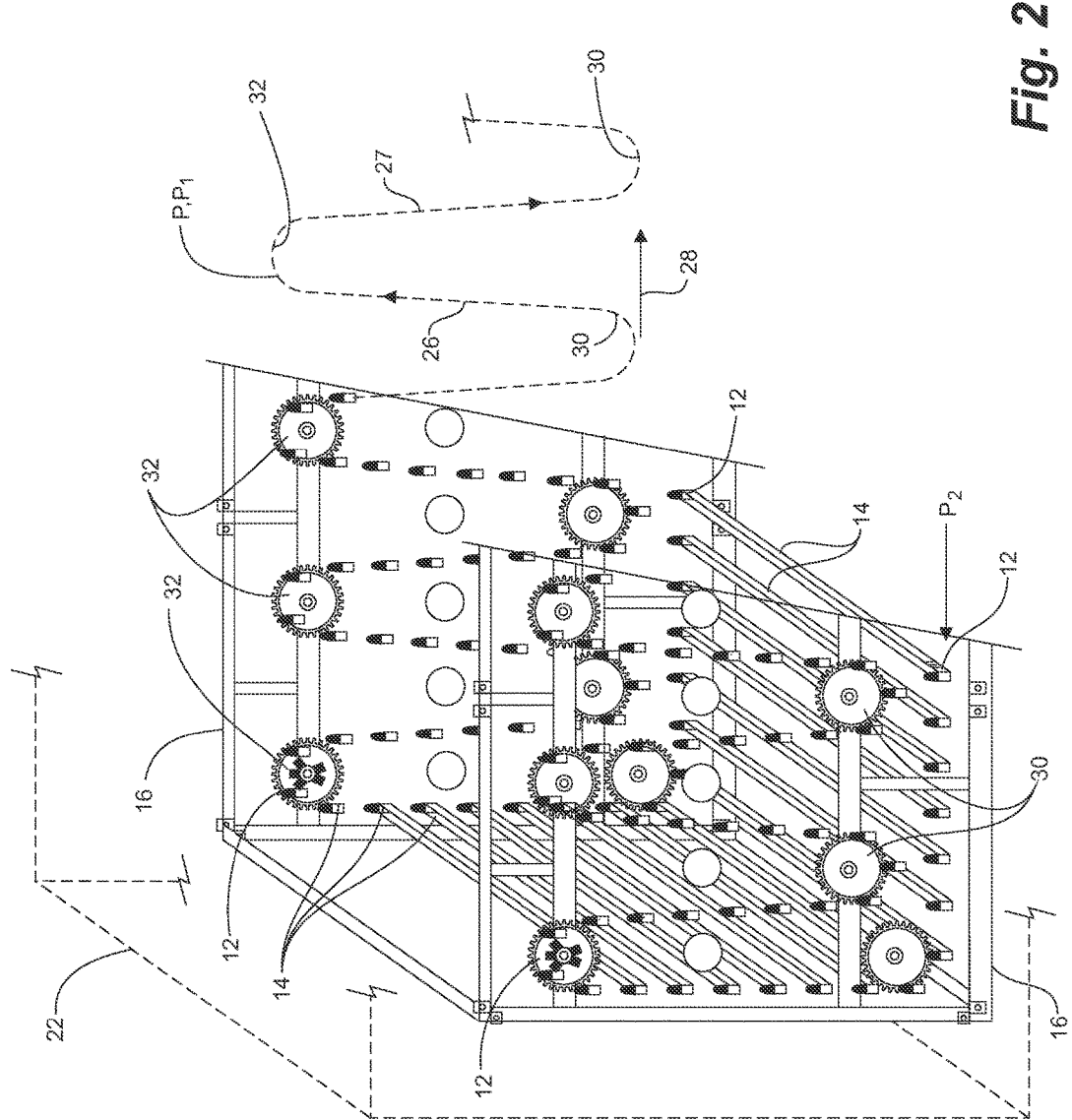
FIG. 2 is a partial, side perspective view of an embodiment illustrating a frame supporting a pair of spaced endless conveyors operatively connected to one another by a gear motor and a common drive shaft, for synchronized movement of the two endless conveyors, only some cradles shown at the transition between the first and second paths, most cradles and the conveyor hidden for clarity of the other elements.

With reference to FIGS. 1 and 2, a system for growing plants in a controlled indoor environment comprises a growing machine 10 for moving cradles of plants along an undulating path P for minimizing the areal footprint of the machine 10. At least one endless conveyor 12 supports one or more horizontally extending growing cradles 14 for progression along the path P, the path lying generally in a plane. The endless conveyor 12 is supported within a frame 16. The path P may lie in a vertical plane. In an embodiment, a multiplicity of cradles 14, 14 . . . are distributed along the conveyor 12 and are supported generally horizontal and thus generally perpendicular to the conveyor path P. The cradles 14 are spaced apart and arranged along the undulating path P like a plurality of gondolas. Each cradle 14 supports one or more plants therealong, the term plants including all stages of growth including such as seeds, seedlings and ultimately plants of a crop of plants.

Figure 3:
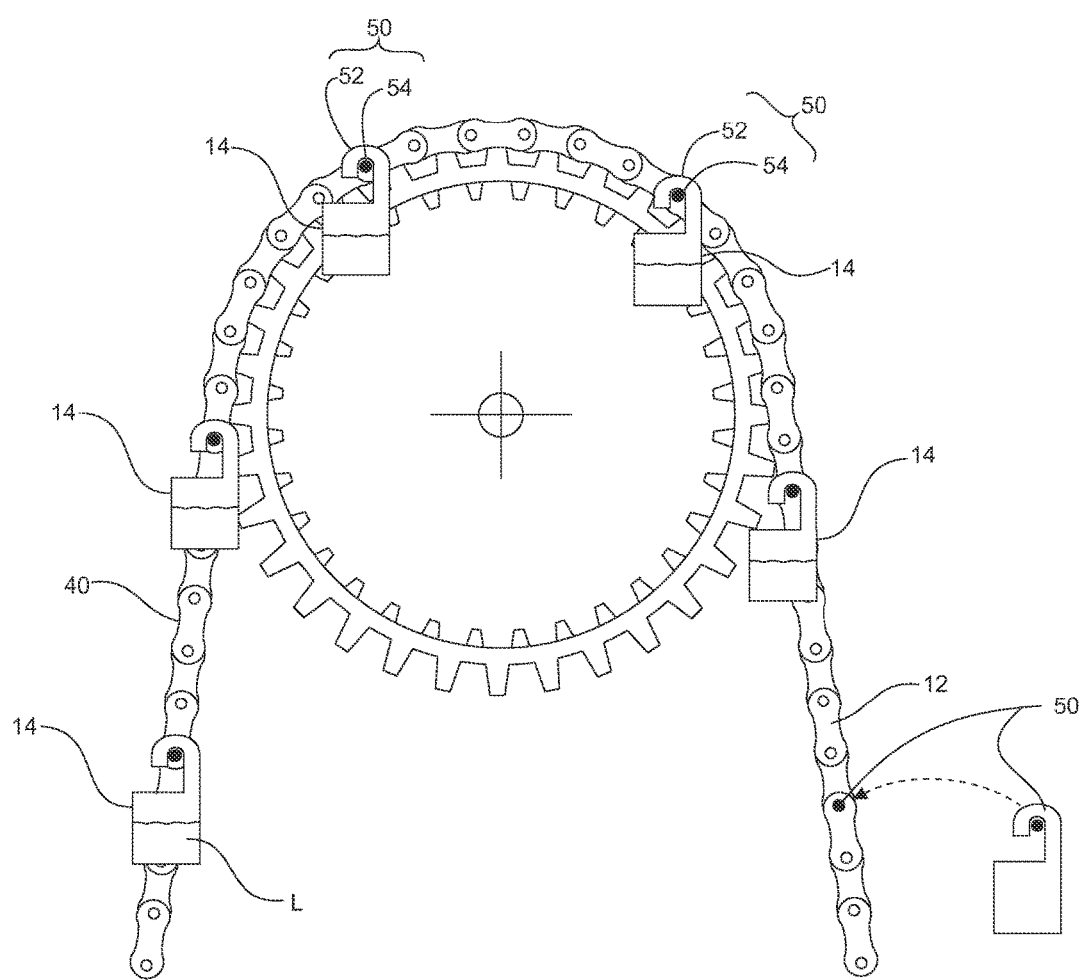
FIG. 3 is a representative drawing of a portion of an endless drive chain conveyor being driven by a sprocket.

The cradles 14 travel along an endless path within the frame 16. The cradles 14 travel along a first path P1 in a first direction and a second return path P2 in a second direction, opposite to the first direction, to return to a first end 20. The growing machine 10 can be housed in a module 22 for individual management and environment control. Two or more machines 10,10 . . . or two or more modules 22, 22 . . . can be arranged in parallel, in series or combinations thereof. A sea or shipping container is an example of a suitable module being robust and having a closable, contained environment. In one embodiment, a module houses a single growing machine 10 having a plurality of cradles 14, 14 . . . each cradle 14 is removably supported upon the conveyor for enabling loading onto the conveyor and removing from the conveyor. Conveniently, for a machine 10, loading occurs at the first end 20 and unloading or removal from the opposing end 24. With reference to FIG. 3, each cradle 14 is pivotally supported upon the endless conveyor 12 so that the cradles hang under the gravity with the plants upright, regardless of the location of the cradle 14 on the conveyor 12 along paths P1,P2. As each growing cradle 14 travels along the first and second paths P1,P2, the plants therein are exposed to growth-sustaining liquid L including water, nutrients and other additives useful for sustaining growth. Various formulations for sustaining liquids L are known in the art of hydroponics and other agricultural processes to encourage and promote plant growth. Each cradle forms a growing environment suitable for one of many types of approaches including hydroponic, such as floating raft, nutrient film and flood and drain systems. Growing media can be provided such as rockwool, coir, peat, or compost.

The conveyor 12 has a rate of travel that can be manipulated to control the length of time the plants remain thereon before reaching a target growth such as being ready for harvest or being of a size suitable for transfer to a subsequent growing machine. Target growth may also be reached when the plant outgrows the space constraints of the machine 10, namely spacing between plants in a cradle or spacing between cradles.

Environmental factors, including sustaining liquid L, $CO_2$ levels, humidity and lights 18 are manipulated including controlling the amounts and exposure provided to the plants while traveling first and second paths P1,P2.

As shown in FIG. 2, in an embodiment, the machine 10 has a width for accommodating the length of the cradles 14 and, as shown in FIG. 1, a longitudinal extent or length, forming a generally rectangular footprint. First path P1 moves from a first end 20 of the machine 10 to a second end 24 of the machine, the second path P2 returning to the first end 20. Path P1 is undulating, having at least a first generally upward path 26 and at least a first generally downward path 27 while also having an incremental longitudinal advance 28 generally therealong as path P1 moves towards the second end. The upward and downward portions 26,27 of the paths can repeat in an undulating manner, repeatedly and alternately traveling up 26 and down 27 and incrementally advancing 28 along an entire length of the longitudinal extent of the machine 10. The first path P1 alternates upwards 26 and downwards 27 between a trough 30 and a peak or apex 32. The apex 32 is within a permissible ceiling height of the frame 16 and the trough 30 is within a lower portion of the frame 16, spaced from the second return path P2. The first path P1 can transition, at an opposing removal end 24 of the frame 16, to the second return path P2 for travel back to the beginning of the first path P1. The return path P2 can be generally horizontal and below the one or more troughs 30,30 . . . of the first path P1, thus creating a continuous loop.

The undulating path increases the effective length of the machine 10, maximizing exposure of the plants conveyed therealong to the environmental factors while minimizing the overall length of the growing machine 10. The undulating first path P1 increases the capacity of the endless conveyor 12, supporting a greater number of growing cradles thereon and providing greater exposure to the environmental factors as opposed to a typical conveyor having just a linear path.

In embodiments described herein, the first path P1 begins at the first loading end 20 of the frame 16. Upward travel at the loading end 20 can include traversing an access or loading position, suitable to allow an operator or apparatus to comfortably and safely position each cradle 14 onto the conveyor 12. The loading position is at some height sufficiently spaced above a work floor or work platform. The rate of travel may be such as to permit loading on-the-fly, or the conveyor may be started and stopped as necessary to permit hanging of each cradle 14 in turn on the conveyor 12. Thus, as each cradle 14 is positioned on the conveyor 12, it advances along the first path P1, leaving sufficient space on the conveyor 12 at the point of access for placement of a subsequent growing cradle 14.

As shown, the second return path P2 can be a linear, generally horizontal path P2. However, in alternate embodiments, the second return path P2 can also be an undulating path for further increasing the production capacity of the growing machine 10, while minimizing its footprint.

Figure 9:
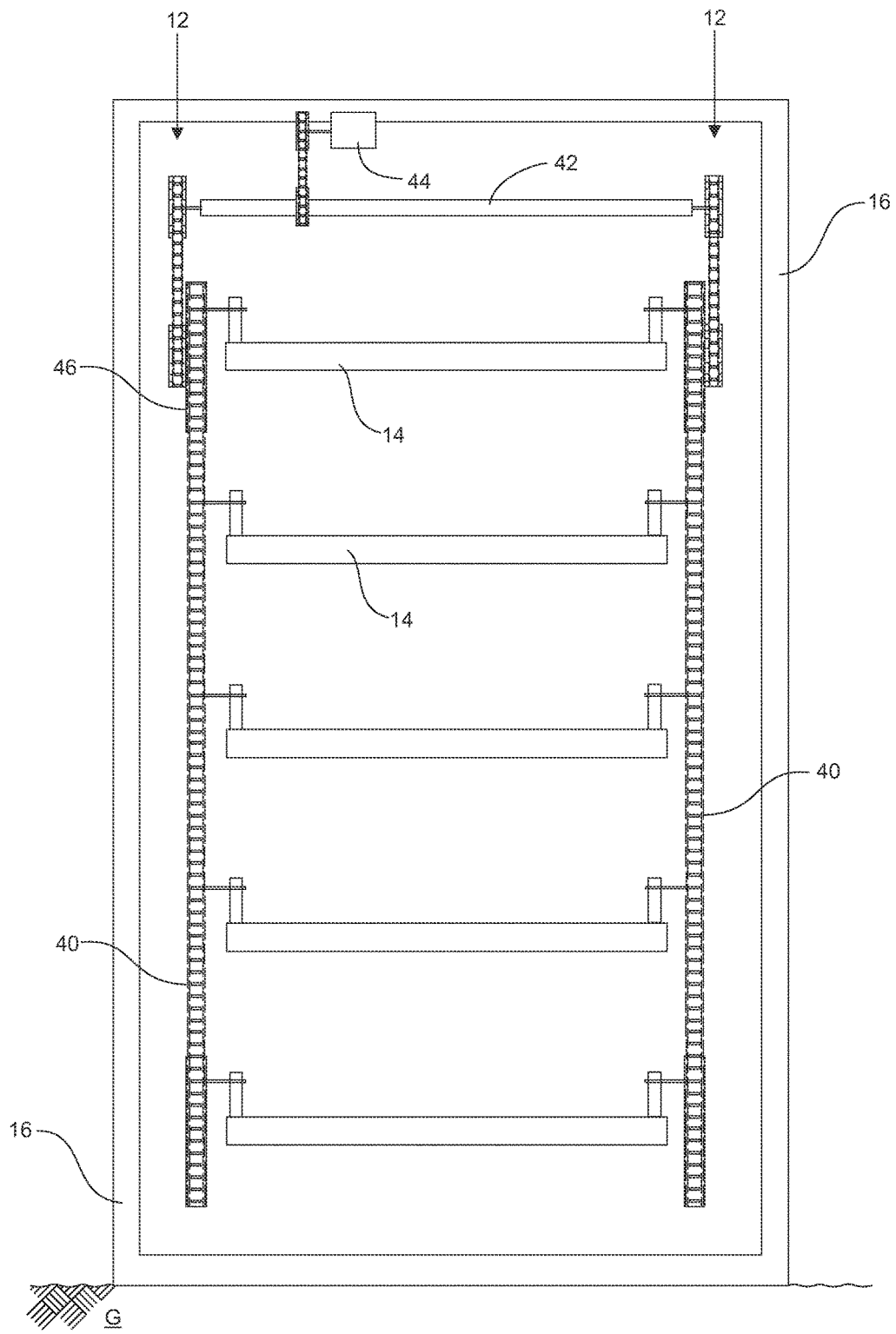
FIG. 9 is an end view of an embodiment illustrating cradle extending horizontally between two synchronous conveyors supported within a frame, each cradle being suspended constantly and substantially parallel to the ground floor.

With reference to FIGS. 2 and 9, and in an embodiment, a pair of endless conveyors 12,12 can be supported, parallel to each other, for supporting cradles therebetween. Each conveyor is in a plane and the respective planes are parallel. Conveniently for a rectangular frame 16, the planes of the conveyors are generally vertical and the conveyors 12,12 are spaced apart to the periphery or side walls of the frame. The plurality cradles 14,14 . . . are suspended between the spaced apart conveyors 12,12. The pair of conveyors are operated for synchronized movement with one another for moving the cradles along the first and second paths P1,P2. As shown, each of the two endless conveyors 12,12 can be a drive chain 40, driven and guided by one or more sprockets. The pair of conveyors 12,12 can be driven by a common drive shaft 42, having a common gear motor 44 and extending across the width of frame 16 for synchronously driving both endless conveyors 12,12 via respective drive sprockets 46,46. The gear motor 44 can be any suitable gear motor for small industrial applications, such as a helical gear motor (Model R37/A R17) available from SEW-Eurodrive GmbH & Co KG of Bruchsal, Germany.

With reference to FIG. 3, each of the conveyors 12 comprises cradle support means 50 for removably and pivotally suspending and supporting the growing cradles 14 extending horizontally therebetween. Thus, as the pair of conveyors 12,12 travel synchronously along the first path P1, the cradles 14 travel up and down while maintaining an upright pant and liquid friendly orientation.

Figure 4:
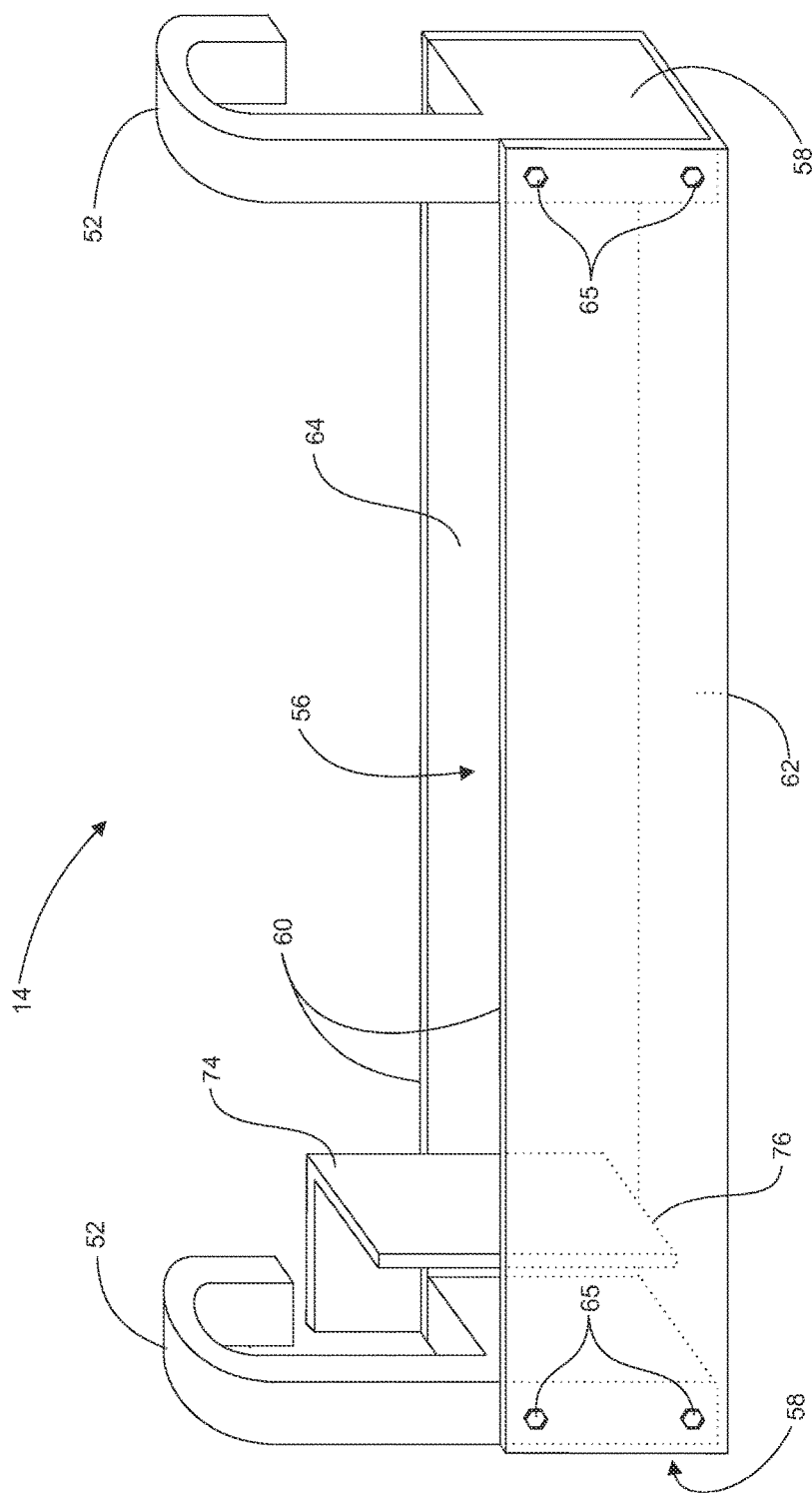
FIG. 4 is side perspective view of an embodiment of a cradle, illustrating hooks on opposing end of the cradle and a backsplash forming a liquid-receiving portion.

With reference to FIGS. 3 and 4, and in an embodiment, each cradle 14 has ends fit with hangers 52 for removable support from the conveyor. The cradle support means comprise a pair of corresponding horizontally pivots, such as a plurality pins 54,54, distributed extending horizontally from each conveyor 12 towards the opposing conveyor 12. Each pin 54 pivotally supports the hanger 52 of a respective end of the cradle 14.

With reference also to FIG. 4, each cradle 14 is a liquid-holding trough 56 for containing and distributing both the plants and growth-sustaining liquid L therealong. Each cradle 14 comprises an open-top, generally rectangular trough 56 having opposing end walls 58,58 and side walls 60,60 and a bottom 62 extending therebetween. The cradle is open at a top 64. Adjacent each end wall 58 comprises the cradle hanger 52, more particularly comprising a hook extending upwardly from the cradle 14 for engaging and hanging from one of the pins 54 distributed along each of conveyors 12 12. The hanger 52 can be integral with the end wall 58, the bottom 62 and side walls 60,60 being fastened to the opposing ends walls 58,58 by fastening means, such as bolts 65. The bottom 62 and side walls 60,60 can be formed of a U-shaped channel material, minimizing seams.

Figure 5A:
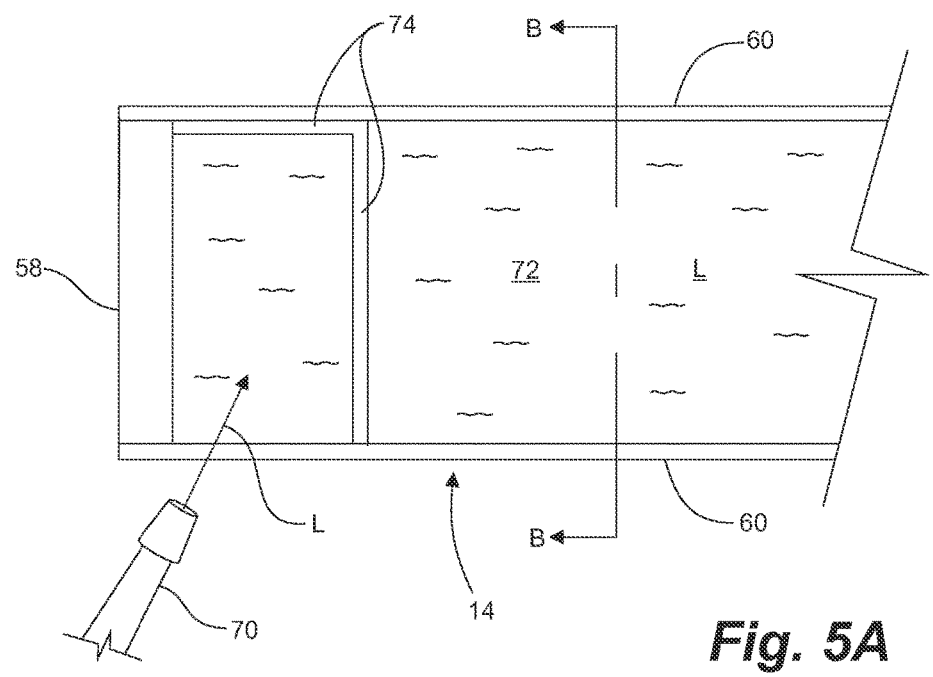
FIG. 5A is a plan view of a nozzle directing growth-sustaining liquid to a liquid receiving portion of a cradle.
Figure 5B:
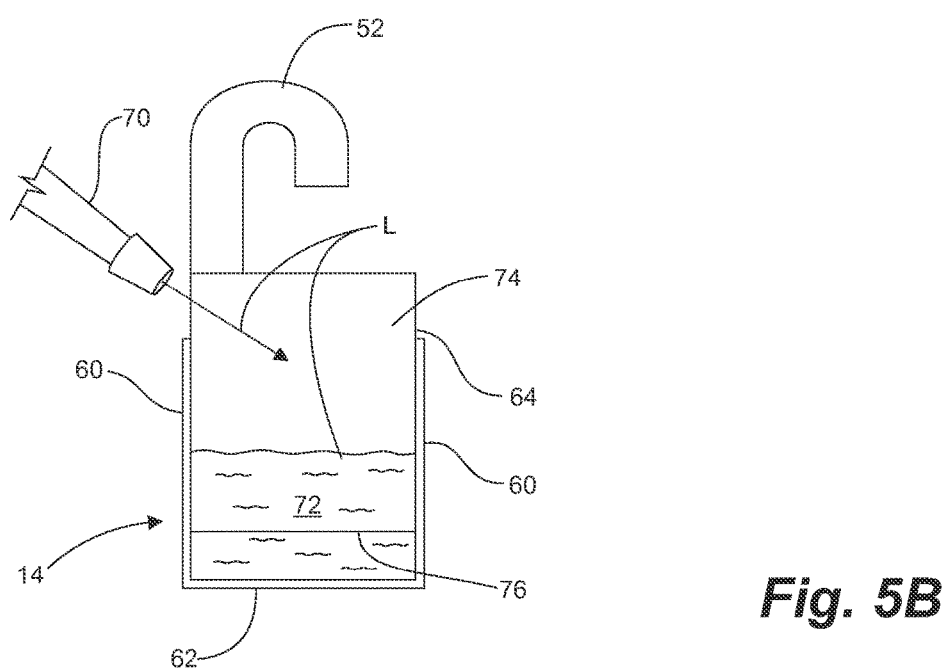
FIG. 5B is a side cross-sectional view of the embodiment along line B-B of FIG. 5A.

With reference to FIGS. 5A, 5B, embodiments of the growing machine 10 further comprise an irrigation system to supply sustaining liquids L to the plants. The liquids L can be applied directly to each plant in each of the growing cradles 14 or can be applied to each of the cradles. The supply of the liquid can be from directly above, such as at the crest or apex 32 of one or more of the undulations of the first path P1, and spaced clear of the path to avoid contact with the cradles. Liquid can also be provided from a point spaced longitudinally from the path P of the cradles.

The sustaining liquid L can be delivered, such as from a common storage tank, to the plants by any suitable irrigation means while each cradle 14 travels along the paths P1, P2. As shown, one irrigation means can comprise a nozzle 70, fluidly connected to the common storage tank, for directing water and/or nutrients pumped from the storage tank to a liquid-receiving portion 72 of each cradle 14.

With reference to FIGS. 5A, 5B, 6 and 7, for maximizing optional arrangements for supplying liquid input to the cradles and minimizing liquid losses through spray and splash, each cradle 14 comprises a backsplash 74 as necessary to intercept the liquid L and directing the liquid into liquid-receiving portion 72. As shown, the backsplash 74 is positioned at one end of the cradle 14 extends above the top 64 of the cradle 14 for maximal interception of the liquids L. The backsplash 74 has a lower edge 76 spaced from the cradle bottom so as to provide a passage 78 (FIG. 6) thereunder to permit liquid to flow out to the remainder of the cradle. The supply nozzle 70 can provide the liquid L from the side of the cradle 14, remaining clear of cradle movement along the path P. The supply of liquid can be timed for providing liquid L only when a cradle is adjacent the nozzle. In one embodiment, the liquid L is provided at an apex 32 of the path P1, or in another embodiment at a transition from path P2 to path P1 or vice versa. Further, the liquid L can be added during the downward movement 27 of the cradle of the first path P1 for assisting with the machine's efficiency of moving the endless conveyors 12/12.

Figure 6:
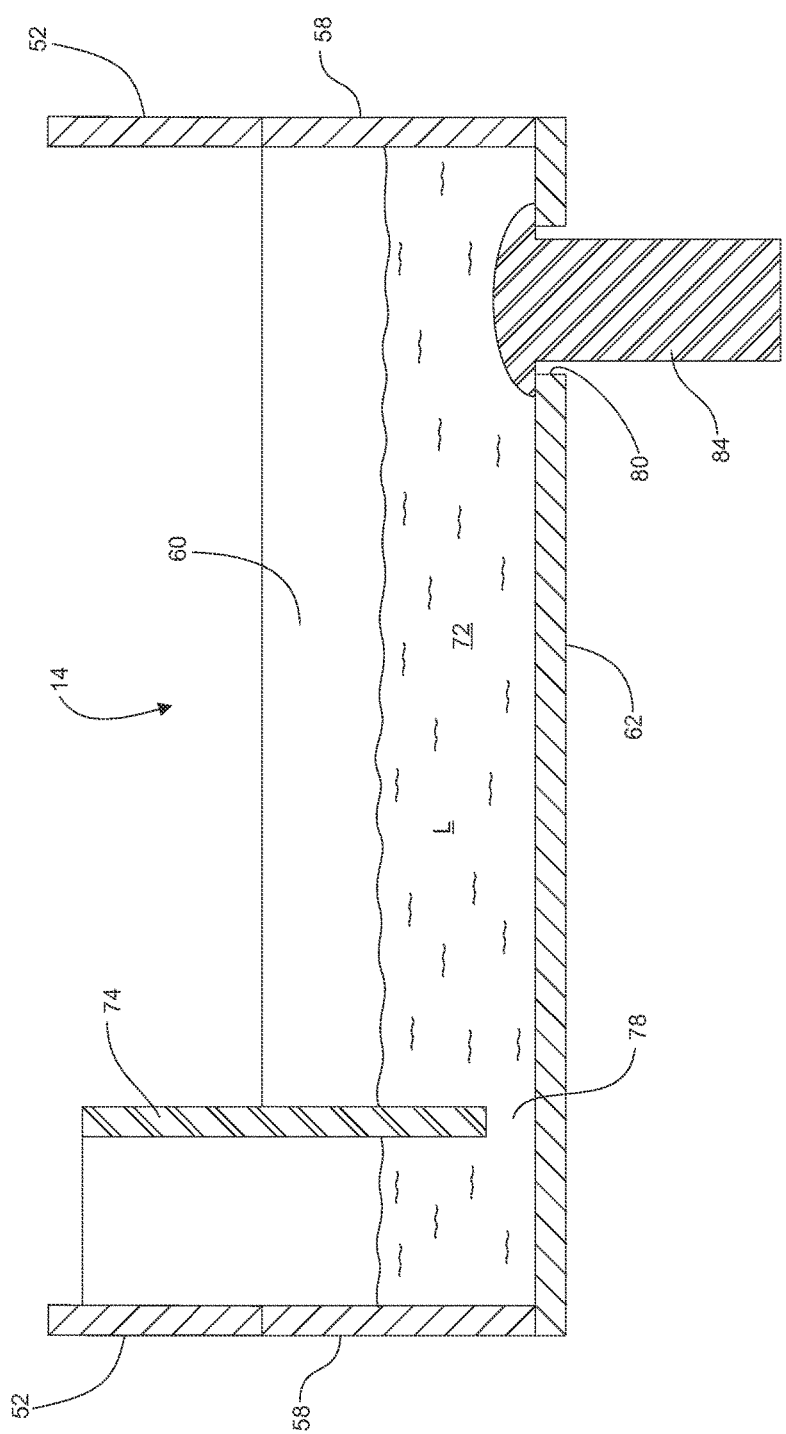
FIG. 6 is a side cross-sectional view of the cradle of FIG. 4, illustrating a drain port in a bottom of the cradle and the liquid receiving portion.
Figure 7:
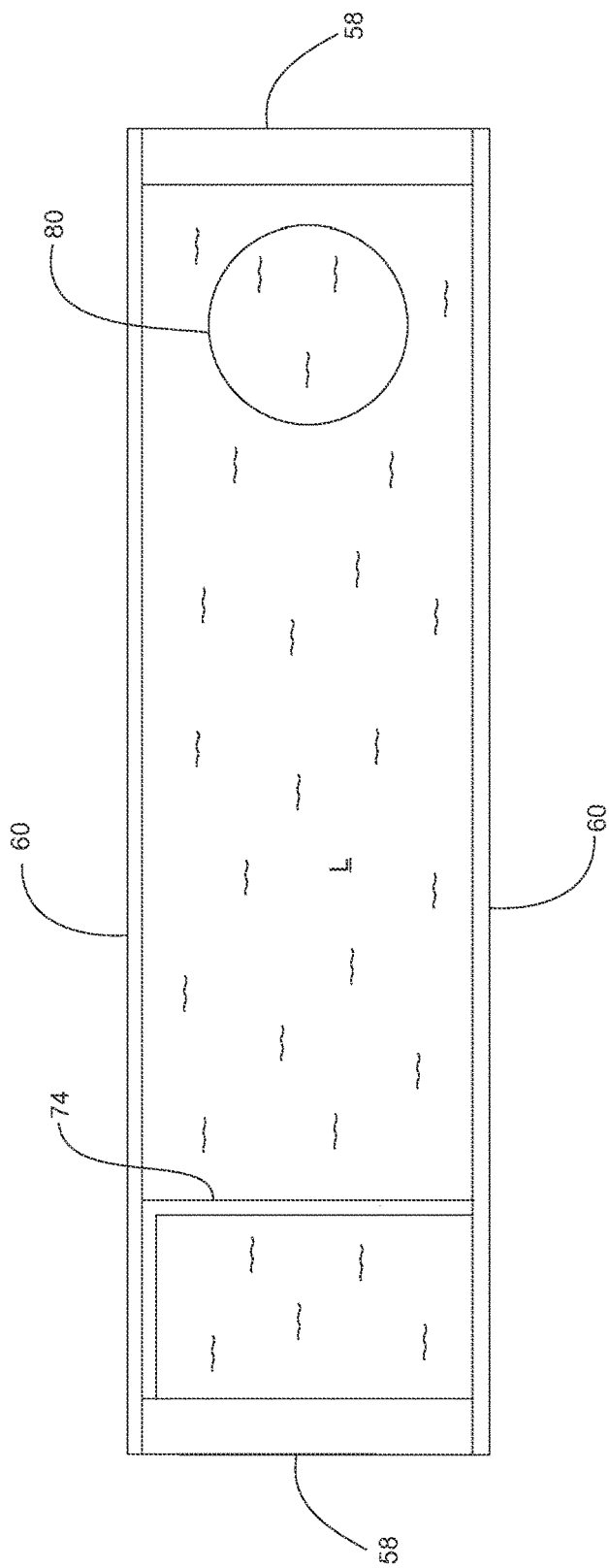
FIG. 7 is a plan view of the cradle of FIG. 4 illustrating the drain port.

FIGS. 6 & 7, liquid is distributed along the bottom 62 of the cradle 14 for access to the plants spaced therealong. A drainage port 80 is provided as commensurate with the growing technique for draining or complete removal of spent liquid in the cradle 14. The drainage port 80 is located adjacent a cradle end 58 opposite the water receiving portion 72.

Figure 8A:
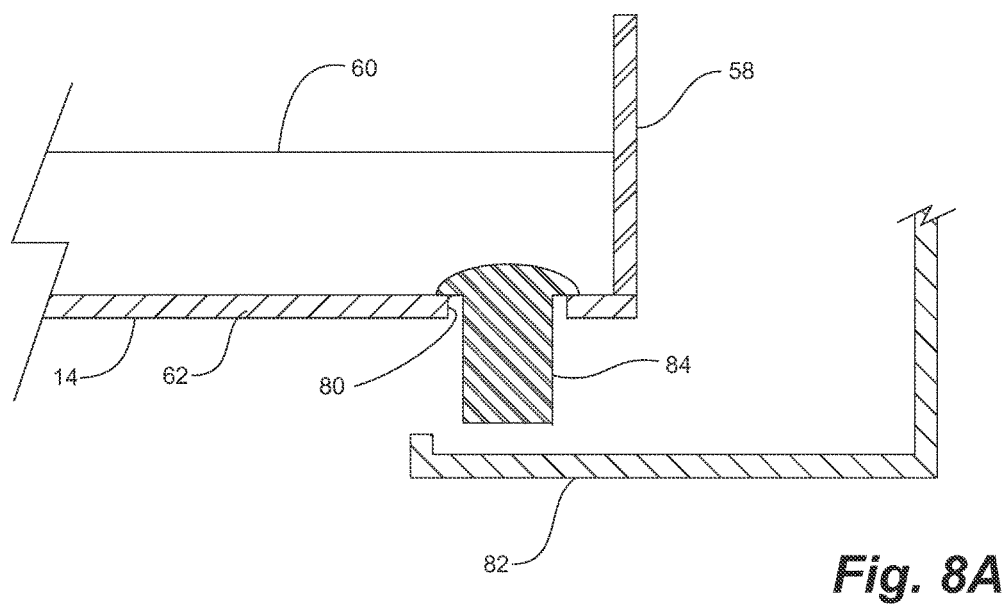
FIG. 8A is a side cross-sectional view of an embodiment illustrating the cradle of FIG. 4 having a drain port in its closed sealed position and approaching a drainage trough as the cradle transitions from a first path to a second return path.
Figure 8B:
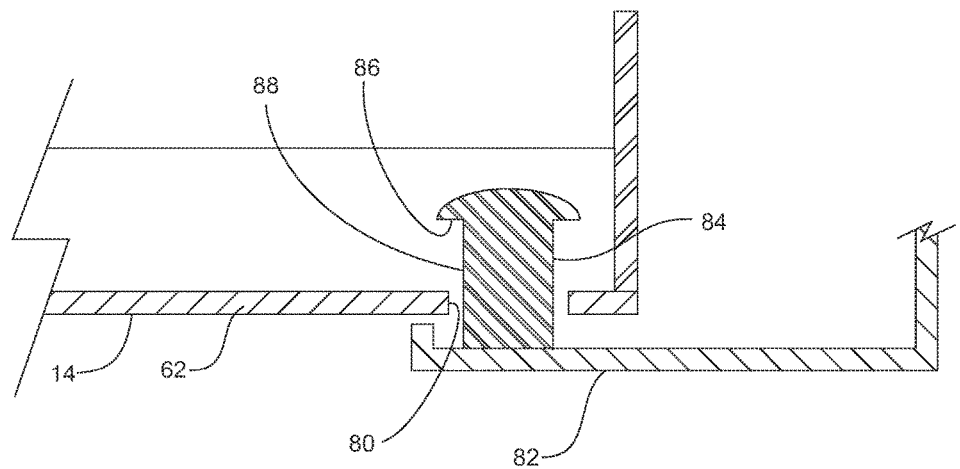
FIG. 8B is a side cross-sectional view of the embodiment of FIG. 8A, illustrating the cradle on its second return path and its plug engaging the drainage trough manipulating and maintaining the plug its open drain position.

With reference to FIGS. 8A to 8C, the frame 16 can further comprise a drainage trough 82 for receiving liquid drained from each of the cradles 14. The drainage trough 82 is positioned below return, second path P2 to intercept the cradles 14 as they travel along the second return path P2. The drainage trough 82 can extend along at least a portion of a length of the second path P2. As shown, each cradle port 80 is fit with a drainage plunger or plug 84. As shown in FIG. 8B, the plug 84 has a sealing element 86 and a shaft 88. In FIG. 8A, the shaft 88 is freely received through the drainage port 80 and rests under its own weight with the sealing element 86 engaging the bottom 62 of the cradle about port 80. The plug is operable between a closed position (FIG. 8A) to retain liquid L in the cradle and an open position (FIG. 8B) for draining the liquid L.

As shown also in FIG. 8C, the plug 84 can be freely manipulated upwardly into its open position for interfering with the sealing element's 86 seal with the cradle 14. The plug 84 is maintained in its open position for draining a portion or all of the liquid from each cradle 14. The shaft 88 of each drain plug 84 is sized sufficiently to have a height that is greater than a spacing between the bottom wall 62 of each cradle 14 and the drainage trough 82 underneath each conveyor 12. Accordingly, as each cradle 14 reaches the second return path P2, the shaft 88 of its drain plug 84 engages the drainage trough 82 (FIG. 8B) and lifts the sealing element 86 off the bottom wall 62 to the open position. The plug 84 is dragged along the length of the drainage trough 82. As second path P2 transitions to first path P1, each cradle 14 moves upwardly (FIG. 8A), releasing the plug 84 and re-engaging the sealing element 86 with the bottom 62 of the cradle 14.

Drained liquid can travel along the drainage trough 82 for recovery, recycling or disposal.

In an embodiment, and as shown in FIG. 9, liquids L are distributed through hydraulic head, being received into the cradle 14 and distributing therealong. In other embodiments, shown in FIGS. 10A through 10D, the cradles 14 are arranged at a slope to more vigorously move incoming liquid from one end to the other.

In FIG. 9, each cradle 14 extends horizontally between the two conveyors 12,12 and is substantially parallel to the ground G upon which the frame 16 is oriented. Liquid L supplied to each cradle will level out, evenly distributing itself within each cradle.

However, in the embodiments of FIGS. 10A and 10B, the growing machine 10 is further provided with means for introducing extra impetus to the distribution of the liquid within each cradle 14. Simply, the cradles are alternately rocked end-to-end so as to urge the liquid one direction and back again. The orientation of each cradle 14 is arranged such that each cradle 14 rocks back and forth while travelling along the first path P1.

As shown in FIG. 10A, during upward travel towards the apex 32 along the first path P1, a first end wall 58a of each cradle 14 can be arranged to be higher than an opposing, second end wall 58b. On a pair of synchronous, continuous endless conveyors 12,12, the first end wall 58a is supported upon its conveyor 12 indexed slightly ahead of or behind that of the other conveyor 12. On the upward movement 26, this indexing creates the slope of each cradle 14, providing the extra impetus for liquid to travel from the higher end wall 58a to the lower end wall 58b and driving downward travel 27, as shown in FIG. 10B, the cradle is sloped from end 58b to end 58a.

Figure 10C:
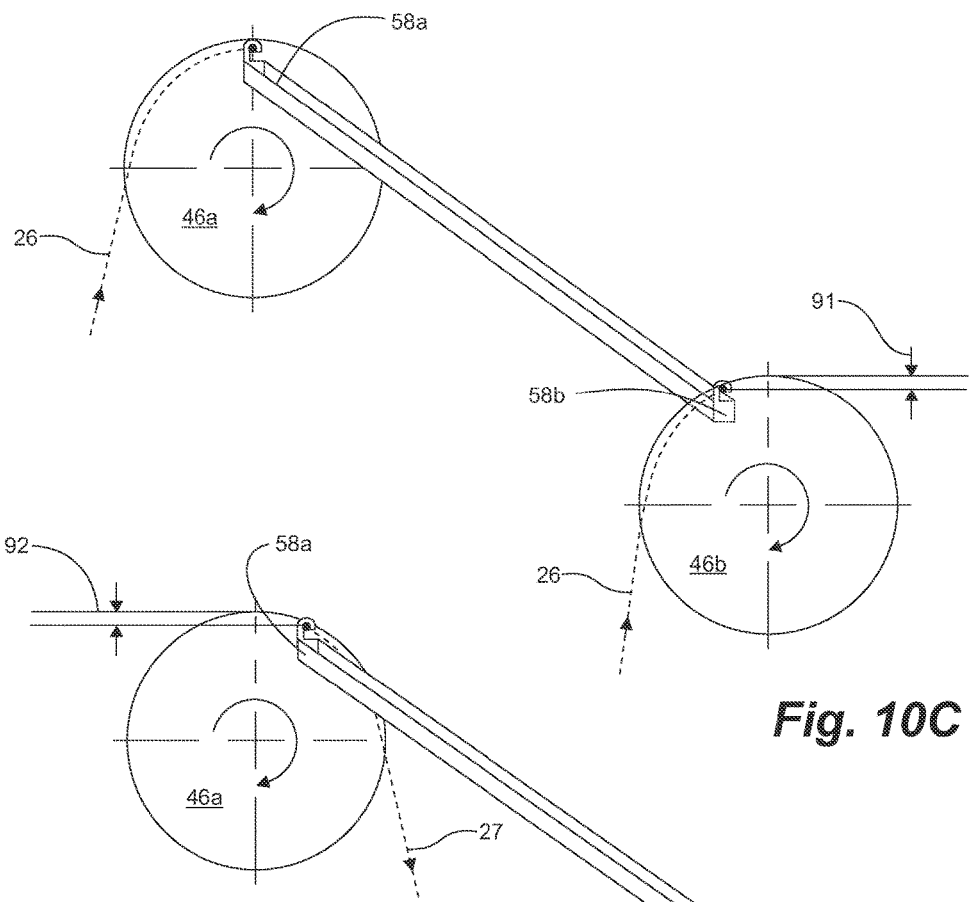
FIG. 10C is a fanciful perspective view of opposing sprockets of a pair of conveyors and one illustrating cradle, the cradle having a first orientation or slope formed by the differential height created by one end being advanced over the other end.
Figure 10D:
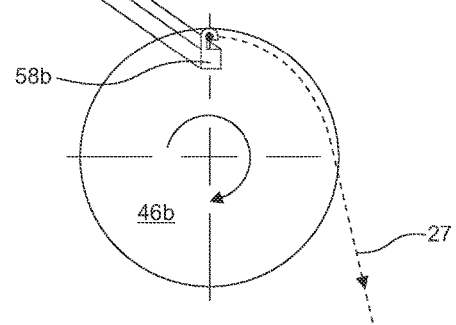
FIG. 10D is a fanciful perspective view according to FIG. 10C illustrating each cradle having a reversed, second orientation or slope as it crests an apex of the undulating path.

As shown in FIG. 10C, the first end wall 58a is indexed ahead of the second end wall 58b and the cradle slopes from the first end wall 58a to the second end wall 58b on the upward movement. On the upward movement 26, the cradle assumed a first horizontal orientation or first slope 91. As the cradle 14 approaches and crests the apex 32, the cradle becomes generally level during transition to moving downward. After cresting, as shown in FIG. 10D, the slope of the cradle reverses, assuming an opposing, second slope 92 which persists on the downward movement 27. As a result, the liquid in the cradle travels from the now higher second end wall 58b to the now lower first end wall 58a. The shifting of the slope 91,92, by rocking of each cradle 14, causes liquid to travel back and forth therein.

In one embodiment, drive sprocket 46a of one conveyor can be rotationally indexed relative to the opposing sprocket 46b, namely by advancing a reference tooth slightly ahead of a reference tooth of the other. Fine control of the indexing can be achieved. In the embodiment, where reference teeth of the drive sprockets 46a,46b are rotationally aligned, such as having identical sprockets, and identically keyed to the drive shaft, an operator can intentionally suspend one conveyor 12 end of a cradle in advance or retarded on the conveyor 12 from the opposing end creating the slope. Depending on the nature of connection between the end wall 58 and the conveyor 12, control over the slope may be coarser. For example, pivot pin 54 for the first end wall 58a can be advanced or index one or more links along the drive chain 40 compared to the synchronously-driven drive chain 40 of the other conveyor, the change in slope being related to the link dimensions and the length of the cradle 14.

Returning to FIG. 1, growing machine 10 further comprises grow lights 18 throughout the frame 16. In an embodiment, a plurality of light sources 18 can be spaced and positioned along the length of the first path P1 to maximize the amount of light exposed to each plant. In the undulating path embodiment, the lights can be provided in each trough between an upwardly moving portion 26 and a downwardly moving portion 27. Accordingly, a light source or array of light sources 18,18 . . . simultaneously reach plants conveyed both on an upward travel and plants conveyed on a downward travel. The lights 18 can be controlled to manage exposure including whether they are on or off or the intensity emitted thereby. The lights 18 can be manually or automatically turned on or off or adjusted to control the exposure, including providing illumination on a light cycle.

In an embodiment, the plurality of light sources 18 can be light emitting diodes (LED's) which permits operator control of the spectrum of light exposed to the planted crops to accommodate and control specific stages of plant growth and development. Furthermore, as LED's draw approximately 25% less power than typical fluorescent lamps, the use of LED's permits the use of solar power feasible which is especially beneficial in remote regions.

Figure 14:
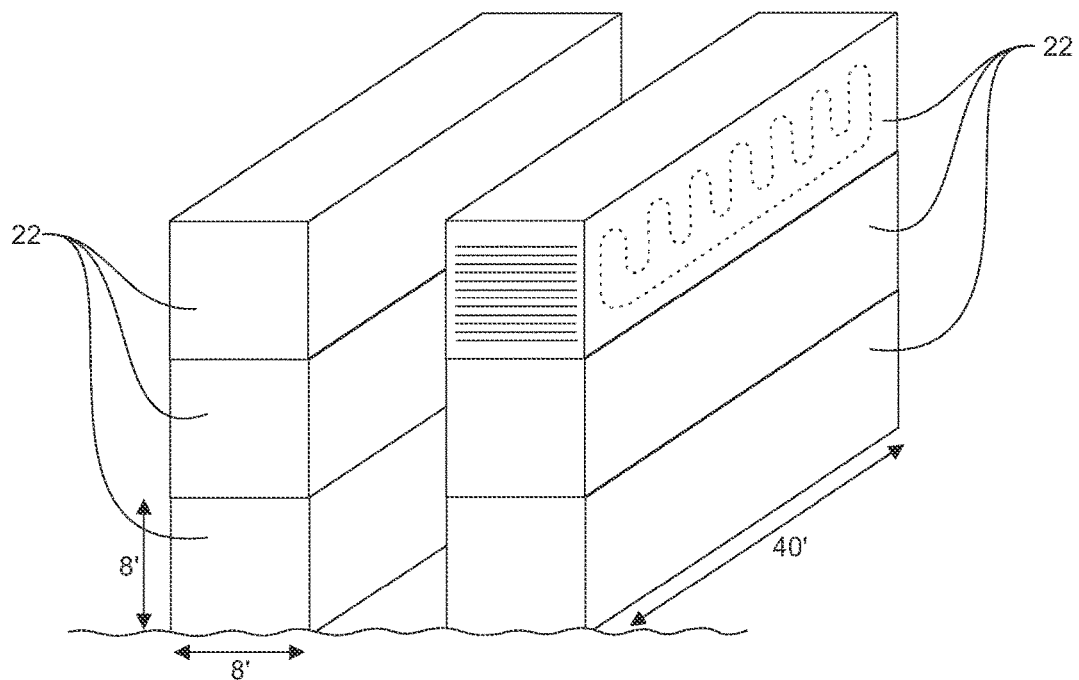
FIG. 14 is a representative drawing of three separate modules each having a growing machine housed therein, the modules being stacked one on top of another for forming a stack.

With reference to FIGS. 2 and 14, in an embodiment, a growing machine 10 can be within or can be supported as part of a module 22. An example of a module 22 is a shipping container having access at an end for loading and removal of cradles or plants. The module can have reflective interior walls to maximize the light available and maximize the exposure of the plants to the light available.

In another embodiment, each module 22 can further comprise means for controlling humidity and temperature therein for providing optimum growth conditions tailored for the plant being grown therein.

In Operation

In one embodiment, a method for growing plants comprises providing at least one growing machine 10 having plurality of generally horizontally extending growing cradles 14 spaced along a continuous or endless conveyor 12 for movement along path P, at least a portion of which is undulating, each cradle bearing one or more plants. One suspends the at least one growing cradle 14 on the growing machine 10 at a first loading position 20 and advances the at least one growing cradle 14 from the loading position upwardly and downwardly, and incrementally longitudinally 28 along a first undulating path P1. Throughout, one exposes the at least one plant to growth promoting light 18 and provides at least growth-sustaining liquid L to the at least one plant. The at least one growing cradle 14 is returned to the loading position along a second return path P2. If mature, the plants can be harvested at convenient access points including the first end 20 or the second end 24. If not ready for harvest, one repeats until the at least one plant is ready for harvest or has reached some other target growth, including having outgrown the cradle or cradle to cradle spacing.

In an embodiment, the rate of advancing of the growing cradles can be controlled for controlling the amounts and rates of the simultaneous delivery of light and sustaining liquids for optimizing plant growth.

In an embodiment, plants are removed from the conveyor after one pass, either for harvest or subsequent handling. In another embodiment, plants are removed from the conveyor after a threshold growth stage such as after reaching a certain maturity or size. In another embodiment, plants are loaded and removed from the same end 20,20 of the conveyor. In another embodiment, plants are loaded from a loading end 20 of the growing machine and removed from a second removal end 24 of the growing machine.

An operator can plant seeds or seedlings within an inert growing medium, such as bricks or cubes of rockwool, readily and commercially available from various horticultural suppliers, such as from Cultilene (of Saint-Gobain Cultilène B.V., Tilburg, The Netherlands) and position the planted seeds or seedlings within a growing cradle. Each loaded or planted growing cradle 14 can be removably and pivotally suspended on the growing machine at the loading position at the loading end 20 of the growing machine 10. The cradles will remain oriented for proper plant growth, regardless of the tortuous path of the conveyor machinery itself. The cradles travel along the first and second path P1,P2 being exposed to light and provided with at least growth-sustaining liquid for growth.

Turning to FIGS. 12A through 13D, after a period of growth, the plants will reach a target growth for that machine. For example, the plants may be ready for harvest or, although too immature for harvesting, may likely have grown sufficiently enough to encroach on an available growing space of an adjacent plant or cradle and may require an increase in growing space. Thus, the plants of increased size are further spaced apart from one another.

As shown in FIGS. 12A and 12B, in an embodiment merely reflecting demonstration of growth and transport, not necessarily the machine 10, the plants are conveyed from the loading position 20 to a removal point 24. If the plants have reached a suitable growth stage of a growth cycle, the plants can be harvested by removing the growing cradles from the growing machine 10 at the removal point 24 for that machine 10.

In cases where the plants have yet to mature, the plants are conveyed along the first path P1 from the loading position to the removal point 24, and returned along the second path P2 to the loading position 20 to continue the growing process. This endless first to second path P1,P2 circuit or loop can be repeated as long as necessary to reach the target growth stage and/or complete a growth cycle. The target growth stage could include a specified maturity or plant size.

With reference to FIGS. 13A through 13D, a series of growing machines are provided, in series, each managing a stage of the plant's growth cycle. In FIG. 13A, in an embodiment, a first growing machine 10a can be used to grow seedlings from seed. As shown, after a period of growth, the six seeds per cradle germinate and grow into to seedlings. The six seedlings, having increased in size sufficiently to be removed, are removed for transfer to a subsequent or second growing machine 10b.

With reference to FIG. 13B, a received at the loading end of the second growing machine 10b, the six seedlings could be grown to harvest as mature plants. Alternatively, and being plant dependent, the six seedlings could be grown until the immature plants start to encroach on the available growing space of an adjacent cradle. The cradles can be re-distributed to be spaced longitudinally farther apart on the conveyor to increase the available growth space between each cradle or moved to another subsequent growing machine 10c.

As shown, and now with reference to FIG. 13C, a fewer number of plants and a fewer number of cradles, four cradles shown, are transferred and loaded into a subsequent or third growing machine or machines 10c. Similarly, the plants can be harvested or, with reference to FIG. 13D the cradles, bearing larger immature plants, can be moved to one or more subsequent and final machines 10d, as shown in FIG. 13D.

The spacing and stages of growing machines can be pre-determined for particular plant characteristics including growth rates and sizes.

EXAMPLE

Embodiments disclosed herein can comprise one or more stackable modules 22, each housing a frame 16 of a growing machine 10. In an embodiment, and as shown in FIG. 14, a stackable module 22 can be 8 foot by 8 foot by 40 foot, and three modules 22,22,22 can be stacked one on top of another to form a single stack. Thus, a typical 10,000 ft$^2$ warehouse can house in the order of thirteen side-by-side or end-to-end stacks of three growing machines for a total of about 39 growing machines.

Depending upon the design of the warehouse footprint, the placement of the stacks of growing machines can be varied. As shown in FIG. 15A, and for about 10,000 ft$^2$, in one embodiment, thirteen stacks can be aligned into a single column. In another embodiment, and as shown in FIG. 15B, the thirteen stacks can be aligned into four columns of three rows, with one column having a fourth row.

In an embodiment, growing machines are placed into "pods or a defined space" within the warehouse or barn. A pod is a form of module having three, solid wall area, floor to ceiling walls with the forth wall being a door for ease of access. Pod's can contain one or more growing machines appropriate for the barn. For example, for a barn that needed 100 growing machines there could be 20 pods with five growing machines in each. A pod ensures control over the climate environment for the particular crops being grown.

Control of the growing environment at, and within, the growing machine can include water, nutrients, Carbon Dioxide ($CO_2$), humidity and other growth factors. Herein, the growing machine provides all three major functions that are basic to plant growth and development including photosynthesis, respiration and transpiration. As discussed growth sustaining liquid and light is provided. In the case of $CO_2$ management, consumption of $CO_2$ by growing plants can be replaced to avoid impairment of photosynthesis and can supplemented based on type of crop and conditions. $CO_2$ increases productivity through improved plant growth and vigour.

Embodiments described herein are useful in providing a local source of fresh vegetables and fruits with low capital investment, regardless of geographical location. As embodiments can further comprise a means for providing light, water and nutrients to the plants, each module can be located and placed in remote locations or placed in locations close to local markets. Thus, shipping costs are minimized as use of the growing machines is not restricted by region or growing season as any location with a supply of water and power is suitable.

Furthermore, as embodiments can further comprise growing machine within a controlled environment, there is a reduced necessity for an operator to tend to each of the plants, thereby reducing the labour that is associated with typical industrial commercial farming.

Plants can be grown in accelerated growing cycles to meet everyday food needs as well as specialized requirements for specific needs such as by nutraceutical companies. World hunger needs can be addressed locally.

Embodiments can offer environmental advantages such as reduced fossil fuel use in transporting product to market, energy efficiency, reduced and/or negligible nutrient pollution, elimination of the use of toxic pesticides and fertilizers, controlled and reduced water usage and the reuse of abandoned or idle facilities.

In one aspect, a system for growing plants housed in a controlled enclosed environment space is provided comprising: a high density growing machine comprising a series of horizontal, laterally extending growing cradles carrying plants, the cradles being connected to and suspended between synchronized and parallel endless conveyors moving in a undulating path in an upward and downward motion and incrementally longitudinally between a first position and a second position and returning to the first position, a plurality of growth-promoting light sources, means for providing water and plant growth nutrients to the growing cradles. The endless conveyor can be supported in a frame wherein the first position is a loading end and the second position is a removal end of the frame. The frame can be part of or housed within a module.

In an embodiment, said plants are carried on a plurality of growing cradles and as the plants grow the cradles are spaced further apart. One approach is to remove the cradles and place them and space them further apart on a subsequent machine. Another approach is to remove some cradles, leaving the remaining cradles with greater spacing and place the removed cradles on a subsequent machine. The spacing is chosen to maximize the concentration of plants per area of the growing machine.

In an embodiment, said growing cradles are irrigated with water and/or plant nutrients at the peak vertical height on the conveyor chain so that gravity acting on the downward travel assists in lifting the somewhat lighter cradles on the upward travel.

In an embodiment, a plurality of plant growth promoting light sources can be strategically spaced in troughs along the undulating path, can be distributed along the width of the frame, and can be manipulated during periods of plant growth.

In an embodiment, said conveyor chain temporary exits a controlled space or environment, such as to separate the employees from high levels of $CO_2$, or other hazards existing in the controlled growing environment, for loading and unloading the growing cradles.

In another aspect, the system can further comprise apparatus or means for inserting the liquid, such as water and plant nutrients into growing cradles containing a growth medium.

In another aspect, the system can comprise an apparatus or means for providing liquid comprising water and plant nutrients to the growing cradles to grow hydroponically.

In an embodiment, the system can further comprise an apparatus or means for controlling a concentration of gases present in the controlled environment.

The embodiments of the invention in which an exclusive property or privilege is claimed are defined as follows:

1. A method for growing plants in a controlled environment comprising:

providing a growing machine having a pair of parallel synchronous endless conveyors and a plurality of growing cradles spaced apart therealong, wherein the pair of endless conveyors comprise a first endless conveyor and a second endless conveyor, the pair of endless conveyors supporting the plurality of growing cradles, each cradle supporting one or more plants and extending horizontally between the two endless conveyors;

for each of the plurality of cradles, indexing a first end wall supported upon one of the conveyors ahead of a second end wall supported upon the other conveyor;

advancing the conveyors supporting the plurality of cradles along a path, at least a portion of which is a first undulating path having alternating upward and downward portions and a linear return path;

delivering growth-sustaining liquid to the cradles along the first undulating path;

distributing the liquid back and forth in each cradle along the first undulating path by advancing the first end wall ahead of the second end wall on the upward portion so that the first end wall is higher than the second end wall, thereby creating a first slope between the two end walls, the liquid flowing from the higher first end wall to the lower second end wall and on the downward portion, the first end wall now being lower than the second end wall, thereby creating a second opposing slope, the liquid flowing from the higher second end wall to the lower first end wall, wherein the first slope and the second opposing slope are each substantially transversely oriented relative to the first endless conveyor and the second endless conveyor;

exposing the one or more plants to growth-promoting light; and looping back along the linear return path for repeating and advancing the plurality of cradles along the path until the one or more plants have reached a target growth for the machine.

2. The method of claim 1, wherein the advancing of the plurality of cradles along the path until the one or more plants have reached a target growth further comprises:

advancing the plurality of cradles until the one or more plants encroach on an available growing space of another of the plants.

3. The method of claim 1, wherein after the plants have reached the target growth, transferring the cradles to a subsequent growing machine for repeating the advancing the plurality of cradles along the path of the subsequent growing machine until the one or more plants have reached the target growth for the subsequent machine.

4. The method of claim 3 further comprising repeating transferring the cradles, having plants at their target growth for the subsequent machine, to an additional subsequent growing machine until the one or more plants are ready for harvest.

5. The method of claim 1, wherein for any machine or subsequent machine, after the plants have reached the target growth for the machine or subsequent machine, spacing the growing cradles further apart on the conveyor.

6. The method of claim 1, wherein supporting the one or more plants in each growing cradle further comprises planting one or more seeds in an inert growing medium.

7. The method of claim 1 further comprising draining at least a portion of the growth-sustaining fluid in the cradles along the path.

8. The method of claim 1, wherein the exposing of the one or more one plants to growth-promoting light comprises illuminating the plants from a light source located between alternating upward and downward portions.

9. The method of claim 1, wherein the supplying of growth-sustaining liquid to the cradles comprises introducing the liquid to at least one of the downward portions of the path.

10. The method of claim 1 further comprising draining the growth-sustaining liquid from the cradles along the return path.

11. The method of claim 10 further comprising collecting spent growth-sustaining liquid draining from the cradles in a drainage trough below the return path.

12. The method of claim 11 wherein for each cradle further comprising:
- along the return path, engaging a drain plug with the drainage trough for actuating the drain plug to a drain position;
- releasing the drain plug along the first undulating path for receiving the growth-sustaining liquid.

* * * * *